(12) United States Patent
Li et al.

(10) Patent No.: US 12,307,652 B2
(45) Date of Patent: May 20, 2025

(54) PRINT INSPECTION DEVICE, PRINT INSPECTION METHOD, AND PROGRAM

(71) Applicants: KABUSHIKI KAISHA N-TECH, Gifu-ken (JP); KABUSHIKI KAISHA YAKULT HONSHA, Tokyo (JP); TOHOSHOJI KABUSHIKI KAISHA, Osaka (JP)

(72) Inventors: Shenglan Li, Gifu-Ken (JP); Kazumi Banno, Gifu-Ken (JP); Masaki Nagase, Gifu-Ken (JP); Hideki Ota, Tokyo (JP); Kunimitsu Toyoshima, Osaka (JP)

(73) Assignees: KABUSHIKI KAISHA N-TECH, Gifu-ken (JP); KABUSHIKI KAISHA YAKULT HONSHA, Tokyo (JP); TOHOSHOJI KABUSHIKI KAISHA, Osaka (JP)

( * ) Notice: Subject to any disclaimer, the term of this patent is extended or adjusted under 35 U.S.C. 154(b) by 417 days.

(21) Appl. No.: 17/923,912

(22) PCT Filed: Apr. 28, 2021

(86) PCT No.: PCT/JP2021/017037
§ 371 (c)(1),
(2) Date: Nov. 7, 2022

(87) PCT Pub. No.: WO2021/225108
PCT Pub. Date: Nov. 11, 2021

(65) Prior Publication Data
US 2023/0334649 A1    Oct. 19, 2023

(30) Foreign Application Priority Data
May 8, 2020    (JP) .................... 2020-082856

(51) Int. Cl.
*G06T 7/00*    (2017.01)
*G06T 7/11*    (2017.01)
*G06V 30/19*    (2022.01)

(52) U.S. Cl.
CPC ................ *G06T 7/001* (2013.01); *G06T 7/11* (2017.01); *G06V 30/1904* (2022.01);
(Continued)

(58) Field of Classification Search
CPC . G06T 7/001; G06T 7/11; G06T 2207/20021; G06T 2207/30144;
(Continued)

(56) References Cited

U.S. PATENT DOCUMENTS 6,738,515 B1    5/2004   Akagi
8,494,273 B2 *  7/2013   Chevion ............ G06V 30/1914
                                                          382/168

(Continued)

FOREIGN PATENT DOCUMENTS

JP    2003-187187 A    7/2003
JP    2011-112398 A    6/2011
(Continued)

OTHER PUBLICATIONS

International Search Report and Written Opinion issued in PCT/JP2021/017037, mailed Jul. 20, 2021.
(Continued)

*Primary Examiner* — Negussie Worku
(74) *Attorney, Agent, or Firm* — MARSHALL, GERSTEIN & BORUN LLP

(57) ABSTRACT

A print inspection device includes a camera that captures a character printed on an inspection target, a shape matching processor, a deformation pattern generator, and an inspection processor. The shape matching processor checks a shape of a captured character pattern included in a captured image
(Continued)

obtained by the camera against a shape of a preset reference character pattern while changing a deformation degree of the shape of the reference character pattern and searches for a matched character. The deformation pattern generator generates a deformed character pattern obtained by deforming the reference character pattern at the deformation degree to which the character is matched in the shape matching process. The inspection processor inspects whether a printed state of the character is satisfactory from a result of the comparison between the deformed character pattern and the captured character pattern.

10 Claims, 8 Drawing Sheets

(52) U.S. Cl.
CPC .................. *G06V 30/19093* (2022.01); *G06T 2207/20021* (2013.01); *G06T 2207/30144* (2013.01)

(58) Field of Classification Search
CPC ......... G06V 30/1904; G06V 30/19093; G06V 30/1908; G06V 30/1914; G06V 30/1473; B41J 3/40733; B41J 2/2142; G01N 21/909; G01N 21/90; G01N 21/8851; G01N 21/95607; G01N 2021/8854; G01N 2021/8887; G01N 2021/95615

USPC ....................................................... 382/112
See application file for complete search history.

(56) References Cited

U.S. PATENT DOCUMENTS

| | | | | |
|---|---|---|---|---|
| 9,262,700 | B2* | 2/2016 | Tanikawa | G06K 15/027 |
| 2003/0234960 | A1* | 12/2003 | Kaltenbach | G06K 5/02 |
| | | | | 358/3.26 |
| 2006/0238780 | A1* | 10/2006 | Dennison | G06K 17/00 |
| | | | | 358/1.9 |
| 2012/0099792 | A1 | 4/2012 | Chevion et al. | |
| 2013/0250370 | A1* | 9/2013 | Kojima | H04N 1/00047 |
| | | | | 358/405 |
| 2020/0234423 | A1* | 7/2020 | Oki | G06T 7/001 |
| 2022/0172334 | A1* | 6/2022 | Takeuchi | G06T 7/0002 |
| 2023/0142237 | A1* | 5/2023 | Haruta | G06T 7/337 |
| | | | | 382/112 |
| 2024/0338155 | A1* | 10/2024 | Muraishi | G06K 7/1417 |

FOREIGN PATENT DOCUMENTS

| | | |
|---|---|---|
| JP | 2015-036937 A | 2/2015 |
| JP | 2015-087889 A | 5/2015 |

OTHER PUBLICATIONS

Extended European Search Report issued in EP 21800555.1, dated Feb. 23, 2024.

* cited by examiner

PRINT INSPECTION DEVICE, PRINT INSPECTION METHOD, AND PROGRAM

TECHNICAL FIELD

The present invention relates to a print inspection device, a print inspection method, and a program that inspect a character printed on a target.

BACKGROUND ART

Conventionally, known print inspection devices perform pattern matching to inspect the printed state of a character that indicates a best-by date or the like printed on a beverage container (target) (for example, Patent Literature 1 to 3). Such a print inspection device captures a character printed on an inspection target with a camera and performs pattern matching between a captured character pattern of the captured character and a template including a preregistered reference character pattern to calculate the similarity between the captured character pattern and the reference character pattern. Then, the print inspection device determines whether the printed state is satisfactory depending on whether the similarity reaches a preset threshold value.

The print inspection device of Patent Literature 1 executes a matching process for a region into which an image region corresponding to one character is divided, while checking divided templates. The print inspection device of Patent Literature 2 performs inspection by registering a dot pattern and quantifying the positional relationship of each dot relative to a registered pattern that has a high matching rate. The print inspection device of Patent Literature 3 performs inspection by checking a normal character mask that includes areas for which demerit points are set and referring to a calculated score.

CITATION LIST

Patent Literature

Patent Literature 1: Japanese Laid-Open Patent Publication No. 2011-112398
Patent Literature 2: Japanese Laid-Open Patent Publication No. 2015-87889
Patent Literature 3: Japanese Laid-Open Patent Publication No. 2015-36937

SUMMARY OF INVENTION

Technical Problem

However, in a case where the print surface of an inspection target is, for example, curved or the angle formed by the camera and the print surface is inclined, the captured character may be deformed even if the character is correctly printed on the print surface. The print inspection devices of Patent Literature 1 to 3 are unable to inspect such a deformed character. Even if they can inspect such a deformed character, they need to execute a matching process by registering a large number of templates corresponding to the deformation degree of a character. This makes the inspection process longer. For example, in the case of inspecting a character printed on an inspection target (e.g., container) that is carried in an assembly line, the accuracy and speed of inspecting the character need to be improved. However, the conventional print inspection devices have difficulty improving the accuracy and speed of inspecting a character. This creates the need for a print inspection device capable of improving the accuracy and speed of inspecting a character even if a captured character is deformed.

It is an objective of the present invention to provide a print inspection device, a print inspection method, and a program capable of improving the accuracy and speed of inspecting a character printed on an inspection target.

Solution to Problem

A print inspection device that solves the above-described problem inspects a character printed on an inspection target. The print inspection device includes a capturing section that captures a region of an inspection target including a portion on which the character is printed. The print inspection device includes a shape matching processor that executes a shape matching process to check a shape of a captured character pattern included in a captured image obtained by the capturing section against a shape of a preset reference character pattern while changing a deformation degree of the shape of the reference character pattern and to search for a matched character in which a similarity of the shape of the captured character pattern to the shape of the reference character pattern is greater than or equal to a threshold value. The print inspection device includes a deformation pattern generator that generates a deformed character pattern. The deformed character pattern is obtained by deforming the reference character pattern at a deformation degree to which the character is matched in the shape matching process. The print inspection device includes an inspection processor that inspects whether a printed state of the character is satisfactory from a result of comparison between the deformed character pattern and the captured character pattern.

In this configuration, the shape matching process is executed to check the shape of the captured character pattern against the shape of the reference character pattern while changing the deformation degree of the shape of the reference character pattern and search for the matched characters in which the shape similarity of the captured character pattern to the reference character pattern is greater than or equal to the threshold value. The deformed character pattern, obtained by deforming the reference character pattern at the deformation degree to which the character is matched, is generated. Whether a printed state of the character is satisfactory is inspected from a result of comparison between the deformed character pattern and the captured character pattern. Thus, even if the printed characters are deformed in an allowable range, the result of the comparison between the deformed character pattern, deformed in correspondence with the deformation degree, and the captured character pattern can be used to inspect whether the characters are satisfactory. This improves the accuracy and speed of inspecting a character printed on an inspection target.

Divided reference character patterns are obtained by dividing the reference character pattern by a predetermined number of divisions. Divided character patterns are obtained by dividing the captured character pattern by the number of divisions. In the print inspection device, the shape matching processor may execute, for each of divided regions, a shape matching process to check a shape of the divided reference character pattern against a shape of the divided character pattern while changing deformation degree of the divided reference character pattern and to search for a matched divided reference character pattern in which a similarity between the shape of the divided character pattern and the shape of the divided reference character pattern is greater than or equal to a threshold value. Further, the deformation pattern generator may generate a divided deformed character pattern for each of the divided regions based on the deformation degree and the divided reference character pattern for each of the divided regions and generate the deformed character pattern by synthesizing the divided deformed character patterns into a single character.

In this configuration, the divided reference character patterns matched in the shape matching process executed for each divided region are synthesized into a single character at the corresponding deformation degree, thereby synthesizing the deformed character pattern. This further increases the accuracy of inspecting printed characters.

In the print inspection device, the number of divisions of the divided reference character patterns may be individually set for each of characters.

In this configuration, the number of divisions of the divided reference character patterns is individually set for each character. This increases the accuracy of inspecting a character while limiting a decrease in the speed of inspecting a printed character.

In the print inspection device, partition lines that divide a rectangular region including the divided reference character patterns may include two or more oblique partition lines that intersect a side of the rectangular region at an acute angle. Further, the rectangular region may be divided into three or more divisions by the partition lines including the two or more oblique partition lines.

In this configuration, as compared with when the rectangular region is divided only by partition lines that include lines parallel to the sides of the rectangular region, the accuracy of inspecting printed characters is further increased.

In the print inspection device, the shape matching processor may change the deformation degree by changing at least one of a size or a rotation angle of the reference character pattern.

In this configuration, the shape matching process checks the shape of a character while changing at least one of the size or rotation angle of the reference character pattern. This further increases the accuracy of inspecting printed characters.

In the print inspection device, the inspection processor may inspect whether the printed state of the character is satisfactory by generating an inspection region identifying image in which the deformed character pattern is overlapped with a character region including the captured character pattern in the captured image at a matching position and executing a shade inspection for a background image other than the deformed character pattern in the inspection region identifying image.

This configuration allows for inspection of whether the printed character includes print detects (e.g., print shifts, stains, and blurs) and thus allows for accurate inspection of whether the printed state of the printed character is satisfactory.

In the print inspection device, the inspection processor may inspect whether the printed state of the character is satisfactory by generating an inspection region identifying image in which the deformed character pattern is overlapped with a character region including the captured character pattern in the captured image at a matching position and executing a shade inspection for a region of the deformed character pattern in the inspection region identifying image.

This configuration allows for inspection of whether the printed character includes print detects (e.g., print shifts, blurs, and incomplete dots) and thus allows for accurate inspection of whether the printed state of the printed character is satisfactory.

In the print inspection device, the inspection processor may inspect whether the printed state of the character is satisfactory by executing a shade inspection for a combined character region that is obtained by combining a region of the captured character pattern and a region of the deformed character pattern that are overlapped at a matching position with a character region including the captured character pattern in the captured image.

This configuration allows for inspection of whether the character printed on an easily-deformable print surface includes print detects (e.g., print shifts, blurs, and incomplete dots). Thus, this configuration allows for accurate inspection of whether the printed state of the printed character is satisfactory and makes the inspection result uniform.

A print inspection method that solves the above-described problem inspects a character printed on an inspection target. The print inspection method includes a capturing step that captures a region of an inspection target including a portion on which the character is printed. The print inspection method includes a shape matching processing step that executes a shape matching process to check a shape of a captured character pattern included in a captured image obtained in the capturing step against a shape of a preset reference character pattern while changing a deformation degree of the shape of the reference character pattern and to search for a matched character in which a similarity of the shape of the captured character pattern to the shape of the reference character pattern is greater than or equal to a threshold value. The print inspection method includes a deformation pattern generating step that generates a deformed character pattern. The deformed character pattern is obtained by deforming the reference character pattern at a deformation degree to which the character is matched in the shape matching process. The print inspection method includes an inspection processing step that inspects whether a printed state of the character is satisfactory from a result of comparison between the deformed character pattern and the captured character pattern. The print inspection method provides the same advantages as the print inspection device.

A program that solves the above-described problem is executed by a computer that executes a character inspection process that inspects a character included in a target image. The program causes the computer to execute a shape matching processing step that executes a shape matching process to check a shape of a captured character pattern included in the target image against a shape of a preset reference character pattern while changing a deformation degree of the shape of the reference character pattern and to calculate a similarity of the shape of the captured character pattern to the shape of the reference character pattern. The program causes the computer to execute a deformation pattern generating step that generates a deformed character pattern. The deformed character pattern is obtained by deforming the reference character pattern at a deformation degree to which the similarity is greater than or equal to a threshold value. The program causes the computer to execute an inspection processing step that inspects whether a printed state of the character is satisfactory from a result of comparison between the deformed character pattern and the captured character pattern. The same advantages as the print inspection device are gained by causing the computer to execute the program.

Advantageous Effects of Invention

The present invention improves the accuracy and speed of inspecting a character printed on an inspection target.

DESCRIPTION OF EMBODIMENTS

A print inspection device and a print inspection method using the device according to an embodiment of the present invention will now be described with reference to the drawings. The device and method are used to inspect the printed state of a character representing, for example, a manufacturing year, month, and day printed on a beverage container that accommodates beverage (e.g., beer or juice).

Figure 1:
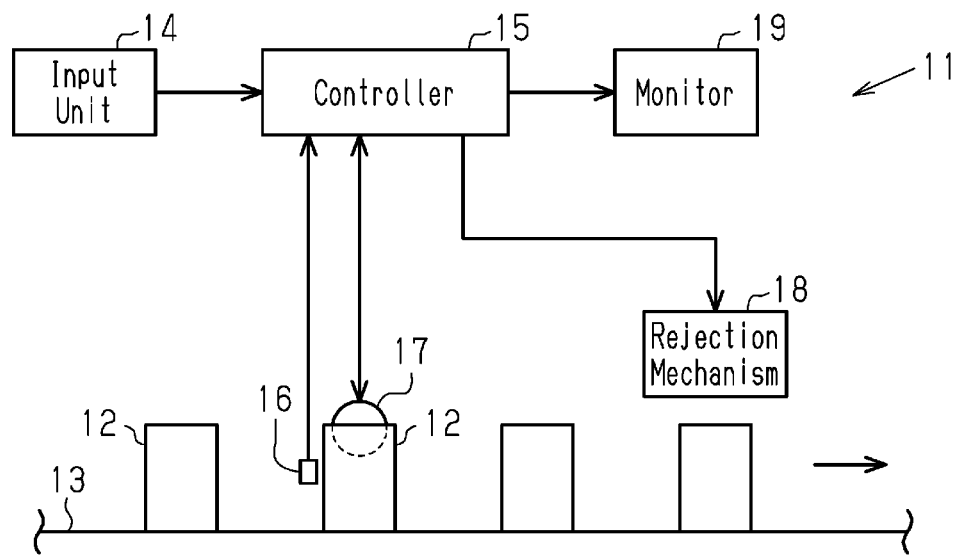
FIG. 1 is a block diagram showing the entire configuration of a print inspection device according to an embodiment.
Figure 2:
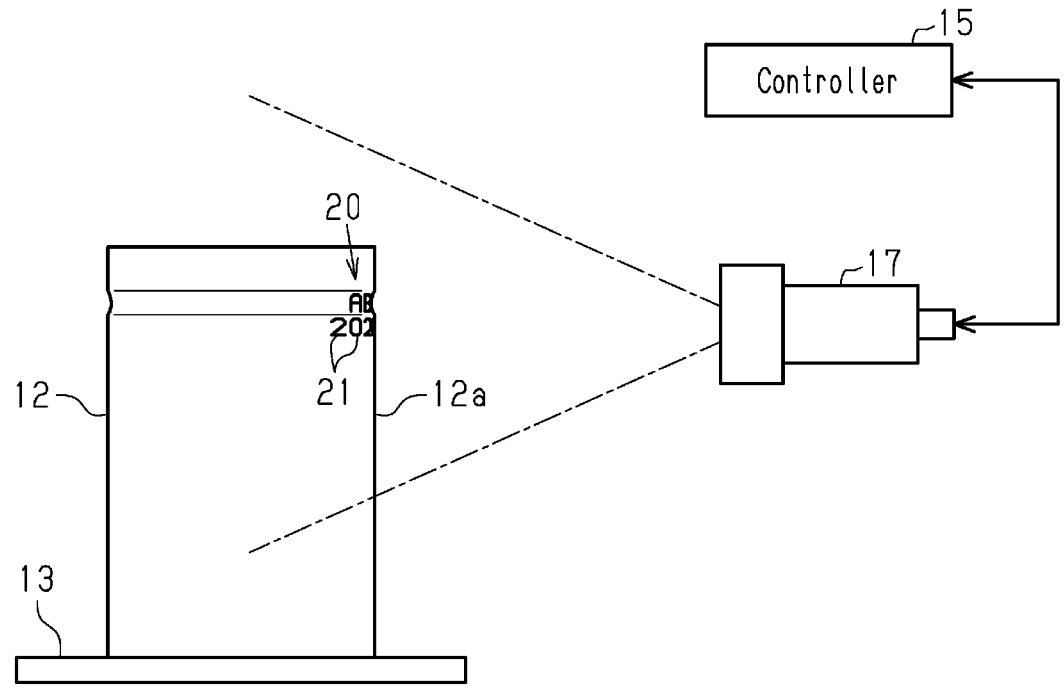
FIG. 2 is a side view showing the camera and the beverage container on which a character string is printed.
Figure 3:
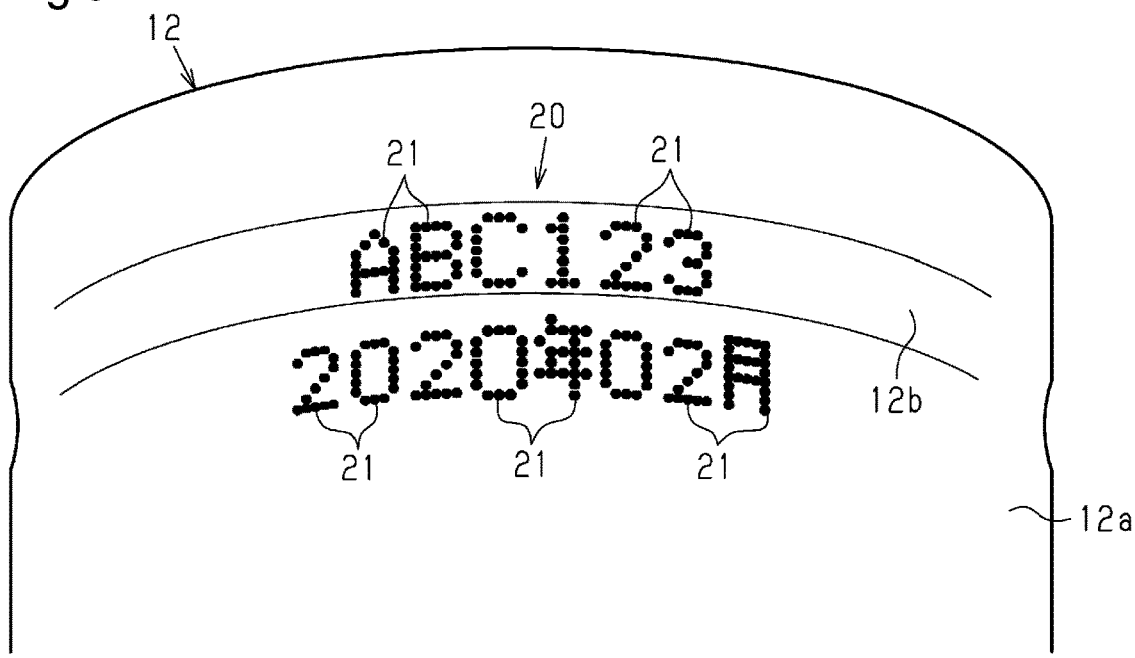
FIG. 3 is a side view showing the character string printed on the beverage container.

As shown in FIG. 1, a print inspection device 11 is disposed in the vicinity of a belt conveyor 13. The belt conveyor 13 sequentially carries beverage containers 12 (example of inspection targets) from the upstream side toward the downstream side in a carrying direction that is shown by the arrow in FIG. 1. Each beverage container 12 is carried by the belt conveyor 13. As shown in FIGS. 2 and 3, a character string 20 is printed on a predetermined region on an outer circumferential surface 12a of each beverage container 12, using an inkjet printer (not shown). The character string 20 is composed of characters 21 that include a manufacturing year and month.

As shown in FIGS. 2 and 3, in the present embodiment, the printed character string 20 includes a lot number and a manufacturing year and month. FIG. 3 shows an example of the character string 20 printed on the beverage container 12. The character string 20 includes, for example, a lot number "ABC123" in the upper section and a manufacturing year and month "2020 年 02 月" (which means February 2020) in the lower section. The lot number is represented by the characters 21 that include alphabetical characters, numbers, and symbols. The manufacturing year and month is represented by the characters 21 that include the kanjis "年" (which means year) and "月" (which means month). The character string 20 may be a manufacturing year, month, and day, instead of a manufacturing year and month. The manufacturing year and month or the like representing a manufacturing time may be replaced with a best-by date or an expiration date. The character string 20 may include only a lot number.

As shown in FIG. 1, the print inspection device 11 includes a controller 15 that controls the running state of the print inspection device 11. The controller 15 is electrically connected to a light sensor 16 and a camera 17. The light sensor 16 senses each beverage container 12 carried by the belt conveyor 13. The camera 17 is an example of a capturing section that captures the characters 21 (see FIG. 2) printed on the predetermined region of the beverage container 12 that has been sensed by the light sensor 16. The controller 15 is electrically connected to a rejection mechanism 18. The rejection mechanism 18 rejects, from the belt conveyor 13, the beverage container 12 in which the characters 21 have been determined as having print defects. The controller 15 drives and controls the camera 17 and the rejection mechanism 18 in addition to receiving, from the light sensor 16, a sensing signal that has sensed the beverage container 12. When receiving the sensing signal from the light sensor 16, the controller 15 outputs a capturing instruction signal to the camera 17 so that the camera 17 captures the character string 20 printed on the beverage container 12.

As shown in FIG. 2, the camera 17 captures the predetermined region including the character string 20 printed on the beverage container 12. The image data captured by the camera 17 is transmitted to the controller 15. The orientation of the beverage container 12 that is being carried is adjusted such that the pre-printed character string 20 faces the front of the camera 17.

As shown in FIG. 3, when characters are printed on a curved surface such as the outer circumferential surface 12a of the beverage container 12, the distance from the camera 17 to each character 21 differs depending on the position of the character 21. The difference in distance varies the sizes of characters 51 (see FIG. 7) captured by the camera 17. Additionally, when characters are printed on a curved surface such as the outer circumferential surface 12a of the beverage container 12, the angle formed by the print surface on which the characters 21 are printed and the optical axis of the camera 17 differs depending on the position of the character 21. The difference in angle produces differences in the characters 51, which are captured by the camera 17, according to the deformation degree. The example in FIG. 3 includes a recess 12b that has the shape of a circumferential groove so as to intersect the print surface of the beverage container 12. The character 51 is also deformed by the recess 12b.

Figure 4:
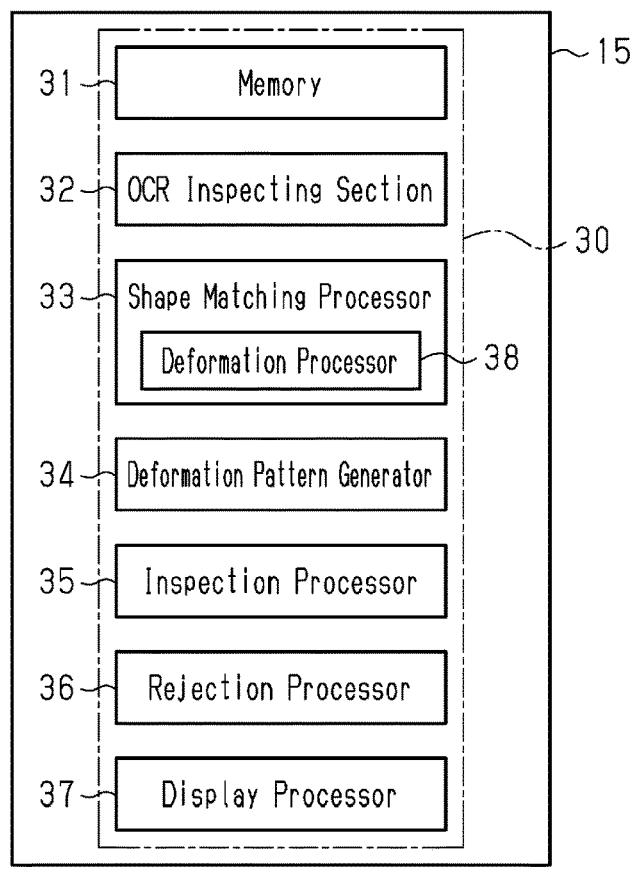
FIG. 4 is a block diagram showing the inside of the controller of the print inspection device.

As shown in FIG. 4, the controller 15 includes a computer 30. The computer 30 includes a CPU and a memory 31, which includes a ROM and a RAM. The computer 30 includes software components that are activated by executing a print inspection program stored in the memory 31. The software components include an optical character recognition (OCR) inspecting section 32, a shape matching processor 33, a deformation pattern generator 34, an inspection processor 35, a rejection processor 36, and a display processor 37.

The OCR inspecting section 32 captures a printed character using the camera 17 to read it as an image and checks the image with data to recognize the character, thereby converting the character into an electronic text to inspect the character from the text data of the character. The memory 31 stores, in advance, the data of characters that can be recognized by the OCR inspecting section 32. The OCR inspecting section 32 recognizes the characters 21. If the character string 20 includes an unrecognizable character, the OCR inspecting section 32 determines that the character has a print defect. When the OCR inspecting section 32 recognizes the characters 21, the positions of the characters 21 are identified.

The shape matching processor 33 checks the shape of a captured character pattern 53 (see FIG. 8) for each character included in a captured image obtained by the camera 17 against the shape of a reference character pattern 41 (see FIG. 5), which is a character pattern for reference for each of the preset characters, while changing the deformation degree of the shape of the reference character pattern 41. Through this check, the shape matching processor 33 calculates the similarity of the shape of the captured character pattern 53 to the shape of the reference character pattern 41. The shape matching processor 33 searches for a matched character in which the similarity of the shape of the captured character pattern 53 to the shape of the reference character pattern 41 is greater than or equal to a threshold value.

The shape matching processor 33 includes a deformation processor 38. The deformation processor 38 executes a deformation process that deforms the reference character patterns 41 of templates 40 and divided reference character patterns 41*a*, 41*b* and the like of a division template 42 at a predetermined deformation degree. In the present embodiment, the deformation processor 38 changes the reference character patterns 41 or the divided reference character patterns 41*a*, 41*b* and the like at the predetermined deformation degree by changing at least one of the size or rotation angle of each character.

The deformation pattern generator 34 generates a deformed character pattern 46 (FIG. 10G, FIG. 11C) by deforming the reference character pattern 41 at a deformation degree to which a character is matched in the shape matching process. When the deformed character pattern 46 is overlapped with a captured character pattern 51P (see FIG. 8), the deformed character pattern 46 mostly overlaps a correctly-printed portion of the captured character pattern 51P.

The inspection processor 35 inspects whether the printed states of the characters 21 are satisfactory from the result of comparison between the captured character pattern 51P and the deformed character pattern 46. The inspection processor 35 generates an inspection region identifying image 60 (see FIG. 12) in which the deformed character pattern 46 is overlapped at the matching position with a character region 52 that includes the captured character pattern 51P in the captured image. Then, the inspection processor 35 executes a shade inspection for an inspection identifying region of the inspection region identifying image 60 to detect print defects from shade (concentration). The details of the shade inspection will be described later.

In the case of obtaining an inspection result indicating that a print defect has occurred as a result of the print inspection performed by the inspection processor 35, the rejection processor 36 in FIG. 4 drives and controls the rejection mechanism 18 so as to reject, from the belt conveyor 13, the beverage container 12 that includes the print defect.

The display processor 37 executes a display process that causes a monitor 19 to display the result of the inspection performed by the inspection processor 35. When the printed state of the character string 20 printed on the beverage container 12 is satisfactory as a result of the inspection, the display processor 37 causes the monitor 19 to display the character "GOOD," which indicates the satisfactory state. In contrast, when the inspection indicates that the printed state of the character string 21 printed on the beverage container 12 is unsatisfactory (i.e., has a print defect), the display processor 37 causes the monitor 19 to display the character "NG," which indicates the unsatisfactory state.

Figure 5A:
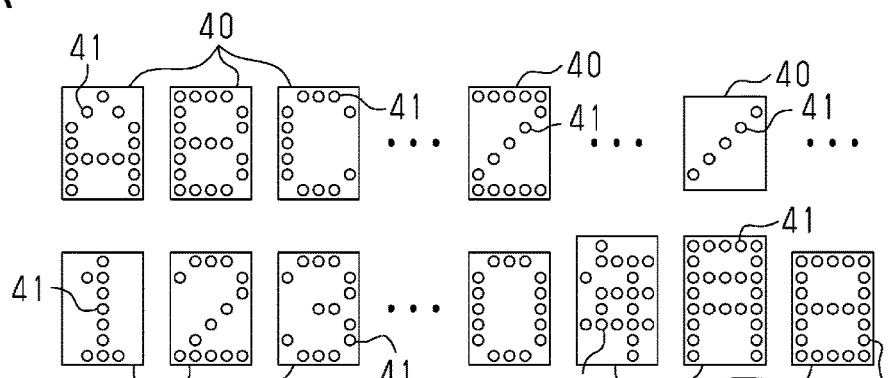
FIG. 5A is a schematic diagram showing the templates used for the shape matching process.
Figure 5B:
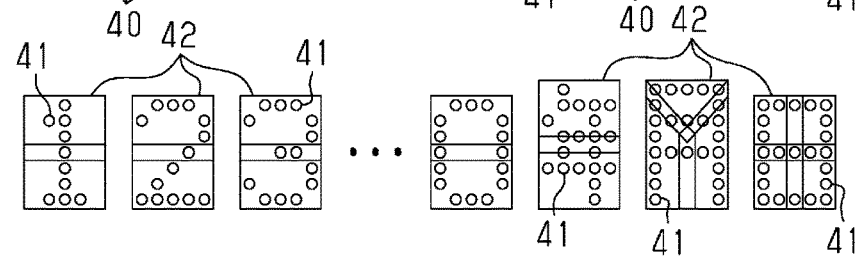
FIG. 5B is a schematic diagram showing the divided templates.

The memory 31 includes the templates 40 (masters) and the division templates 42 (division masters), which are respectively shown in FIGS. 5A and 5B. The templates 40 are used for the shape matching process. Each division template 42 is obtained by dividing the corresponding reference character pattern 41 into multiple sections. Each template 40 includes the corresponding reference character pattern 41, which is character pattern for reference. Each division template 42 includes the divided reference character patterns 41*a*, 41*b* and the like, which are obtained by dividing the reference character pattern 41.

In the present embodiment, uppercase alphabetical characters and lowercase alphabetical characters (not shown) from A to Z, symbols such as slash, and numbers from 0 to 9 are prepared for the reference character patterns 41 included in the templates 40 shown in FIG. 5A. Each division template 42 is obtained by dividing, into multiple sections, at least a part of characters of the corresponding reference character pattern 41 included in the template 40. While the example of FIG. 5 shows one template 40 for each character, multiple templates 40 may be prepared for each character. Each template 40 includes the corresponding reference character pattern 41 that represents the outline of a character. Instead, for example, a configuration may be employed in which a satisfactory (acceptable) captured character pattern in which the printed state is satisfactory is stored (registered) in the memory 31 and an outline extracting process (such as edge detecting process) is executed by the controller 15 for a satisfactory captured character pattern so that the templates 40, 42 used for shape matching are generated before inspection starts.

Figure 6A:
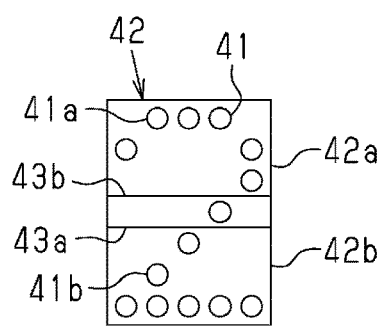
FIGS. 6A and 6B are schematic diagrams each showing a divided template.
Figure 6B:
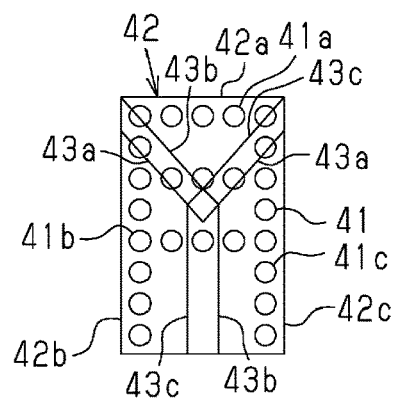

FIGS. 6A and 6B each show an example of the division template 42. FIG. 6A is an example in which the number "2" is divided into upper and lower sections. FIG. 6B is an example in which "月" is divided into three sections. The division template 42 includes, for example, the divided templates 42*a*, 42*b*. The divided templates 42*a*, 42*b* are obtained by dividing, into multiple sections, a rectangular template 40 by one or more partition lines. The boundaries of the divided templates divided into multiple sections partially overlap with each other. The number of divisions are determined according to the shape of the reference character pattern 41.

For example, the division template 42 of the number "2" shown in FIG. 6A includes two divided templates 42*a*, 42*b*. The divided templates 42*a*, 42*b* are obtained by almost halving, into upper and lower sections, the template 40 of the rectangular region including the number "2". The upper divided template 42a is divided by a horizontal partition line 43a. The lower divided template 42b is divided by a horizontal partition line 43b.

The division template 42 of a rectangular region including a kanji such as "月" shown in FIG. 6B includes three divided templates 42a, 42b, 42c. The divided templates 42a, 42b, 42c are three regions into which the template 40 including "月" is divided by Y-shaped partition lines 43a, 43b, 43c. The uppermost divided template 42a is divided by oblique partition lines 43a that form an acute angle relative to a vertical line and a horizontal line that are parallel to the sides of the rectangular region. The left divided template 42b is divided by the partition lines 43b including a vertical line parallel to the sides of the rectangular region and an oblique line. The right divided template 42c is divided by the partition lines 43c including a vertical line and an oblique line.

If the template 40 including "月" is halved into upper and lower sections or left and right sections, the two divided templates are likely to match only one of the two divisions of the target character "月". Also, if the template 40 of "月" is divided into three sections by partition lines horizontal to the vertical direction, two of the three divided templates are likely to have a similar shape and match one of the three portions into which the target character has been divided.

To solve such a problem, in the present embodiment, in the division template 42, the template 40 including "月" is divided into three sections by the Y-shaped partition lines 43a, 43b, 43c as shown in FIG. 6B. Accordingly, in the present embodiment, at least one of the partition lines 43a, 43b, 43c is oblique. The boundaries of the division template 42 overlap each other by an amount corresponding to several pixels (e.g., three to five pixels).

Figure 7:
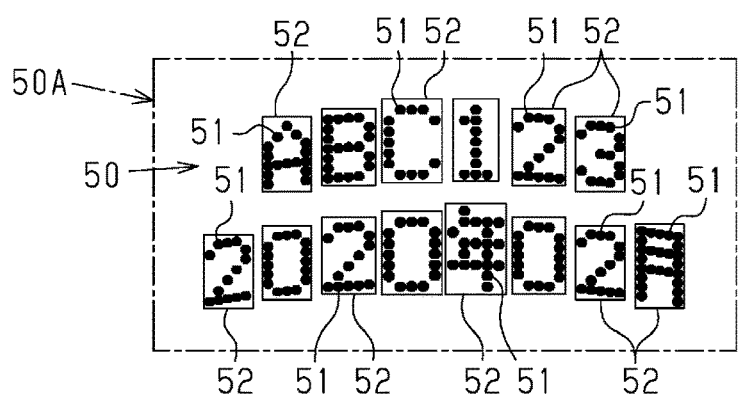
FIG. 7 is a schematic diagram showing a captured character string.

FIG. 7 shows an image captured by the camera 17. As shown in FIG. 7, the captured image includes the character string 50 located in a predetermined print region 50A. The characters 51 of the character string 50 captured in the vicinity of the front of the camera 17 and located in the vicinity of the middle are relatively large and have small deformation degrees. The sizes of the characters 51 become smaller and the deformation degrees of the characters 51 become larger from the middle portion of the character string 50 toward the opposite ends in the horizontal direction. The deformation (rotation) direction of the characters 51 changes depending on the angle formed by the optical axis of the camera 17 and the print surface. The characters 51 may deform (rotate) in the clockwise direction or may deform (rotate) in the counterclockwise direction in FIG. 7 depending on the differences of the print surfaces.

In the present embodiment, the print region 50A is defined from a region at a predetermined position and in a predetermined size of the beverage container 12. Each character region 52 is set for a range that surrounds the corresponding character 51 depending on the position and size of the character 51 recognized through an OCR inspection. The character region 52 is larger than the region of the template 40. Thus, the shape matching process uses the template 40 to search for a matched character having a high similarity in the character region 52 for each character 51.

The template matching includes a shape matching process (outline matching process), which checks the outline of a character and is employed in this example, and a concentration matching process that checks the concentration of a character. For example, a deformed character may be printed or a character deformed by the shape of the print surface may be captured. If matching of a character at a similarity greater than or equal to a threshold value is desired, a template needs to be prepared for each character having a different deformation degree in the concentration matching. If the print surface is curved and thus each character has a different size due to the difference in distance between the camera 17 and the print surface, a template needs to be prepared for each character size in the concentration matching. If characters each have a different brightness, a template needs to be prepared for each different brightness. In such a manner, the concentration matching requires preparation for many templates according to, for example, the deformation degree, size, or brightness of a character.

When a character 51 in the captured image deforms, the frequency at which the similarity becomes greater than or equal to the threshold value (matching frequency) decreases. Even if the character deformation is in an allowable range, the inspection result may be unsatisfactory. For example, if multiple types of reference character patterns 41 are prepared for a single character, the similarity becomes greater than or equal to the threshold value at a higher frequency. However, this significantly increases the number of the reference character patterns 41 that match the captured character pattern 53. As a result, the matching process requires a longer period of time. For example, the character inspection cannot follow the speed of carrying the beverage containers 12 on the belt conveyor 13.

In contrast, the shape matching (outline matching) of the present embodiment checks the shape of a pattern while changing the deformation degree of the reference character pattern 41. Thus, even when the brightness, concentration, or deformation degree (size or rotation angle) of a character is different, inspection can be performed with a single reference character pattern 41. This reduces the number of times matching occurs for an inspection per character. Thus, inspection can be performed for a character printed on the beverage container 12 that is being carried at high speed. Further, the templates 40 and the division templates 42 each provide only the information related to the outline of a character pattern. This reduces the amount of data stored in the memory 31. Accordingly, in the present embodiment, the employment of the shape matching process is the first reason that the speed of inspection can be increased.

Figure 8:
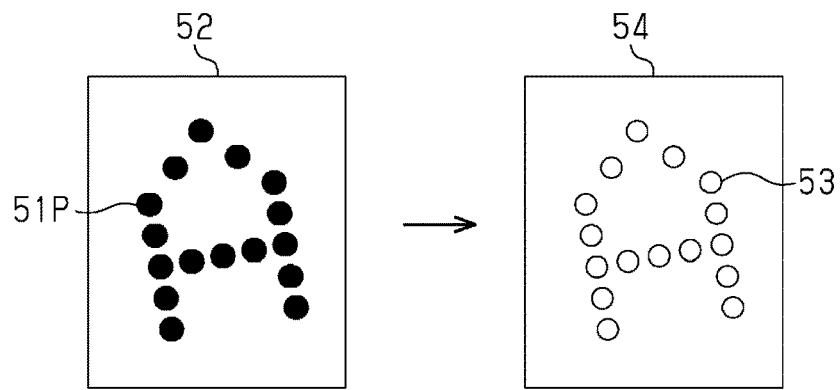
FIG. 8 is a schematic diagram illustrating the outline extracting process for the captured character pattern.

As shown in FIG. 8, before executing shape matching, the controller 15 executes the edge detecting process for the captured character pattern 51P of the character region 52 in advance so as to convert the captured character pattern 51P into the captured character pattern 53, in which the shape (outline) of the character pattern is extracted. In this example, the shape matching process using the template 40 is executed for a character region 54 that includes the captured character pattern 53.

Figure 9A:
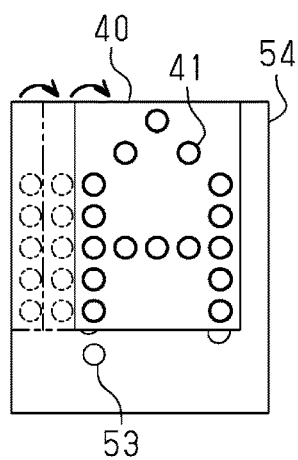
FIGS. 9A to 9E are schematic diagrams each illustrating the shape matching process executed while changing the deformation degree of the reference character pattern.

The shape matching process will now be described with reference to FIG. 9. As shown in FIG. 9A, the shape matching processor 33 sequentially calculates the similarity at each position while sequentially moving the template 40 of the letter A in the character region 54 from the left side toward the right side by a short distance Δx corresponding to a predetermined pixel (for example, one to three pixels). In the calculation, the shape matching processor 33 executes shape matching while changing the deformation degree of the reference character pattern 41 at each position. After moving by one row in X-direction, the shape matching processor 33 sequentially calculates the similarity at each position while moving the template 40 to the next row by a short distance Δy corresponding to the predetermined pixel from the upper side toward the lower side and sequentially moving the template 40 in the next row by the short distance Δx from the left side toward the right side in the same manner. Thus, the shape matching processor 33 executes the shape matching process for the entire character region 54. When the similarity is greater than or equal to a threshold value, the shape matching processor 33 determines that the reference character pattern 41 in the template 40 matches the captured character pattern 53 in the character region 54.

Figure 9B:
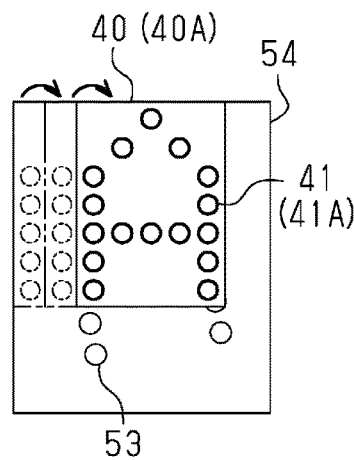
Figure 9C:
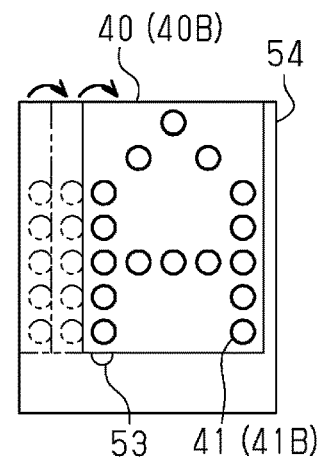
Figure 9D:
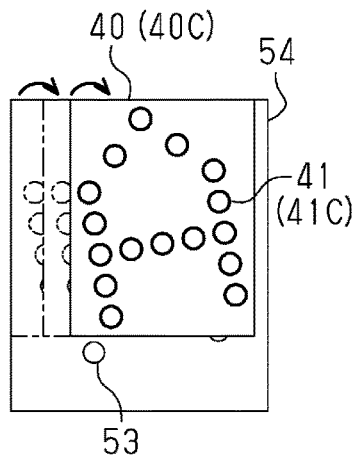
Figure 9E:
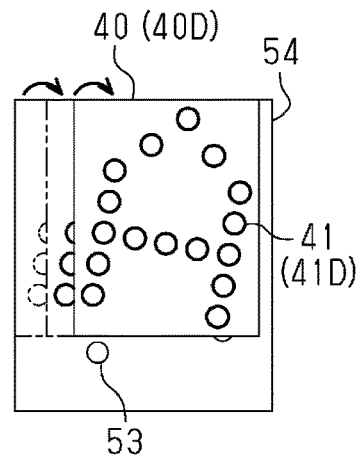

In this example, the deformation processor 38 changes the deformation degree of the reference character pattern 41. Changes in the deformation degree include changes in the character size and changes in the rotation angle. As shown in FIG. 9B, the shape matching process is executed using a template 40A that includes a reference character pattern 41A, which is obtained by reducing the character size of the reference character pattern 41. Further, as shown in FIG. 9C, the shape matching process is executed using a template 40B that includes a reference character pattern 41B, which is obtained by enlarging the character size of the reference character pattern 41. Furthermore, as shown in FIG. 9D, the shape matching process is executed using a template 40C that includes a reference character pattern 41C, which is obtained by rotating the reference character pattern 41 by a rotation angle in the counterclockwise direction. In addition, as shown in FIG. 9E, the shape matching process is executed using a template 40D that includes a reference character pattern 41D, which is obtained by rotating the reference character pattern 41 by a rotation angle in the clockwise direction. The character size changes in multiple stages in an allowable range (e.g., ±10%) of a print. The rotation angle changes in multiple stages in the allowable range (e.g., ±10°) of a print.

The memory 31 of the present embodiment may store multiple types of templates 40 and division templates 42 each having a different resolution. The shape matching processor 33 may execute a pyramid search that executes the shape matching process from low-resolution templates toward high-resolution templates in order.

In the present embodiment, the shape matching process is executed from low-resolution templates toward high-resolution templates in order. Setting is made for n resolutions from a first resolution D1 (the lowest resolution), a second resolution D2, . . . , to nth resolution Dn, where n is a natural number greater than or equal to 2. The present embodiment allows a worker to operate the controller 15 so as to set and select the number of resolution stages for the shape matching process through an input operation performed for an input unit 14, while looking at the setting screen (not shown) of the monitor 19.

As shown in FIGS. 10A, 10B, 10D, and 10F, when the captured image has the nth resolution Dn, the character region 54 including a captured character pattern 531 that has the outline of a character pattern is obtained by converting the image having the nth resolution Dn into an image having a lower resolution D1, D2, . . . Dn−1 and executing the edge detecting process. In FIGS. 10A to 10F, the character region 54 is represented as a character region 541, 542, . . . , 54n and the captured character pattern 53 is represented as a captured character pattern 531, 532, . . . , 53n for each of the resolutions D1, D2, . . . , Dn. Further, the template 40 is represented as a template 401, 402, . . . , 40n and the reference character pattern 41 is represented as a reference character pattern 411, 412, . . . , 41n for each of the resolutions D1, D2, . . . , Dn.

Figure 10A:
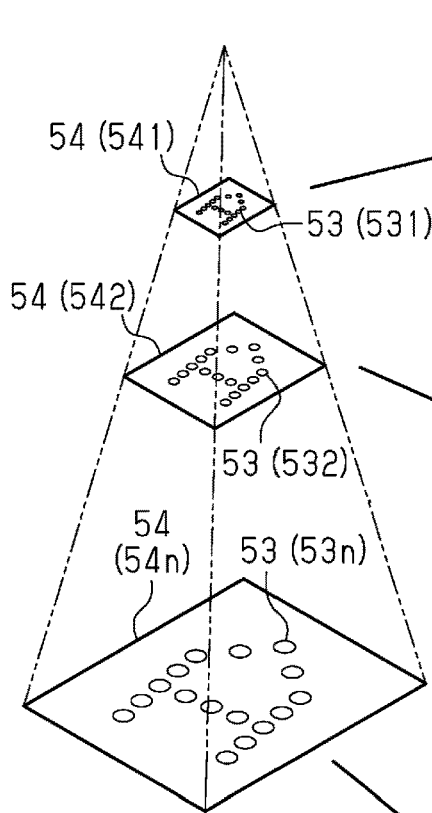
FIGS. 10A to 10G are schematic diagrams each illustrating the pyramid search.
Figure 10B:
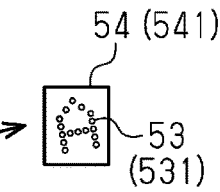
Figure 10C:
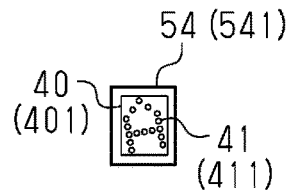
Figure 10D:
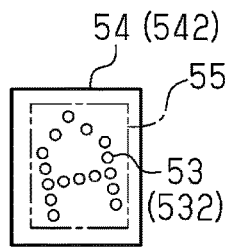
Figure 10E:
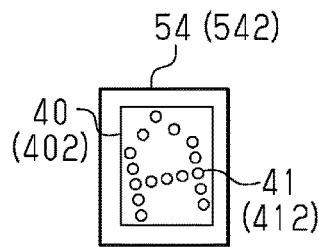
Figure 10F:
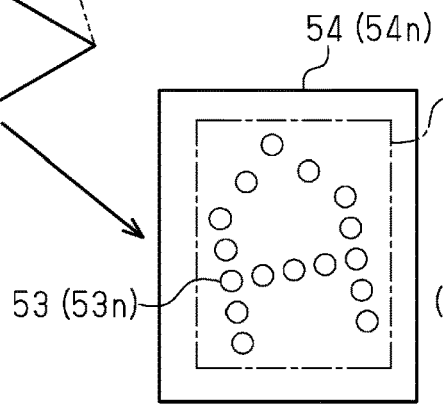
Figure 10G:
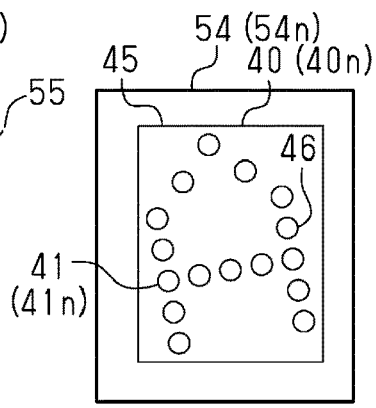

First, the shape matching processor 33 executes the shape matching process for the character region 541 (FIG. 10A) that includes the captured character pattern 531 having the first resolution D1, using the template 401 having the same resolution (FIG. 10C). As a result of the shape matching, when a matched character in which the similarity is greater than or equal to a threshold value is searched for, the shape matching process in the resolution D1 is ended at that point in time. Then, the shape matching processor 33 executes the shape matching process for the character region 542 that includes the captured character pattern 532 having the second resolution D2, which is the resolution of the next height, using the template 402 that includes the reference character pattern 412 having the same resolution. At this time, a range 55 in which a character is matched is narrowed down from the position coordinate of the template 401 matched at the preceding resolution. Thus, the shape matching processor 33 executes the shape matching process within the narrowed range 55 at the next resolution, namely, the second resolution D2 (FIGS. 10D, 10E). The shape matching processor 33 executes this process for each of the resolutions D2 to Dn in the same manner. The range 55 in which the character is matched is narrowed down from the position coordinate of the template matched at the preceding resolution. Thus, the shape matching processor 33 executes the shape matching process within the narrowed range 55 at the next resolution (FIGS. 10F, 10G). By executing such a pyramid search, the shape matching processor 33 searches for a character pattern in an image having the nth resolution at high speed.

When, for example, executing the shape matching process in the character region 54 having the nth resolution without executing the pyramid search, the shape matching processor 33 executes a matching process while moving the template 40 in X-direction by each short distance Δx (e.g., a distance corresponding to one pixel). Then, the shape matching processor 33 shifts the template 40 by one short distance Δy in Y-direction and executes the matching process while shifting the template 40 by each short distance Δx in X-direction in the same manner at the shifted position in Y-direction. The shape matching processor 33 continues this process until the searching of a matched character is completed. In this case, the shape matching process is executed for the entire character region 54 at the nth resolution so that a vast number of positions need to be shifted. As a result, the matching process requires a longer period of time. In contrast, the pyramid search executes a low-resolution shape matching process to narrow down the position of the captured character pattern 53 at high speed, and executes a high-resolution shape matching process in the narrowed range 55. This reduces the total number of times the matching process is executed, allowing a character pattern at the nth resolution Dn to be searched for at a higher speed. Accordingly, in the present embodiment, the execution of the pyramid search is the second reason that the speed of inspection can be increased.

When matching occurs in the shape matching process at the nth resolution Dn (highest resolution), the template 40 in FIG. 10G deformed at the matching deformation degree corresponds to a deformed template 45 that includes the deformed character pattern 46 in which the reference character pattern 41 is deformed at the matching deformation degree.

A divided template is used as necessary in the shape matching process at the nth resolution Dn. That is, in correspondence with the shape of the print surface of the beverage container 12 subject to inspection, an inspection worker operates an input operation unit (not shown) such as a keyboard connected to the print inspection device 11 to set division matching that uses a divided template in order to increase the inspection accuracy. For example, as shown in FIG. 2, in the character string 20 printed on a curved surface, the captured character size is large in the middle region in the width direction and small in the opposite end regions in the width direction (see FIG. 7). Further, the captured characters may be deformed in the opposite ends regions in the width direction and the vertical end regions in the height direction in the character string. In the region having a large deformation degree, even a single character may be captured such that its upper and lower half are captured at a different deformation degree or its left and right half are captured at different deformation degrees.

To solve such a problem, the shape matching process is executed to search for a divided character pattern using the divided templates 42a, 42b for each of the divided regions into which one character region 54 is divided. When the deformation of the character on the captured image results from, for example, the shape of the print surface, the difference in distance from the camera 17 to the print surface, or shift of the print in an allowable range, it is appropriate to determine the printed state as being acceptable, instead of being unsatisfactory. Thus, the present embodiment allows for an inspection in which the printed state is determined as being acceptable when the character on the captured image is deformed in the allowable range.

Figure 11A:
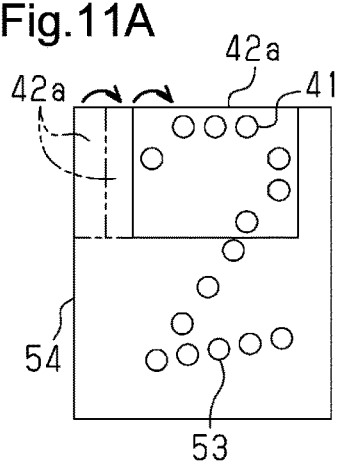
FIGS. 11A to 11C are schematic diagrams each illustrating the shape matching process using the divided template.
Figure 11B:
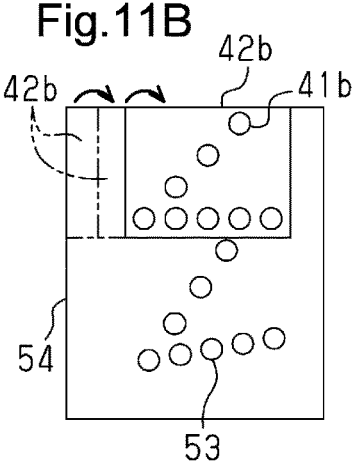
Figure 11C:
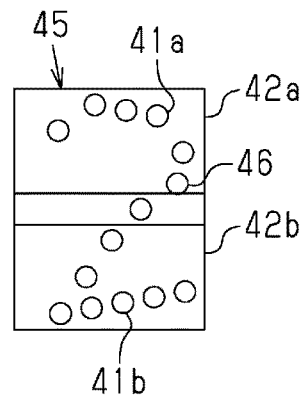

As shown in FIGS. 11A and 11B, the divided templates 42a, 42b are used to execute the shape matching process for the character (e.g., the number 2) for which division matching is specified. As shown in FIG. 11A, the shape matching process is executed for the captured character pattern 53 in the character region 54 to check the first divided template 42a including the upper half divided reference character pattern 41a while moving the first divided template 42a by each short distance Δx. When the first divided template 42a is deformed at a first deformation degree, the similarity is determined as being greater than or equal to a threshold value. Next, as shown in FIG. 11B, the shape matching process is executed for the captured character pattern 53 in the character region 54 to check the second divided template 42b including the lower half divided reference character pattern 41b while moving the second divided template 42b by each short distance Δx. When the second divided template 42b is deformed at a second deformation degree, the similarity is determined as being greater than or equal to a threshold value. As shown in FIG. 11C, the deformation pattern generator 34 generates the deformed template 45 including the deformed character pattern 46 by synthesizing the first divided template 42a, which includes the divided reference character pattern 41a deformed at the first deformation degree, and the second divided template 42b, which includes the divided reference character pattern 41b deformed at the second deformation degree. To restore the deformed character pattern 46 as a character region, the process of regional morphology is employed as necessary.

Figure 12:
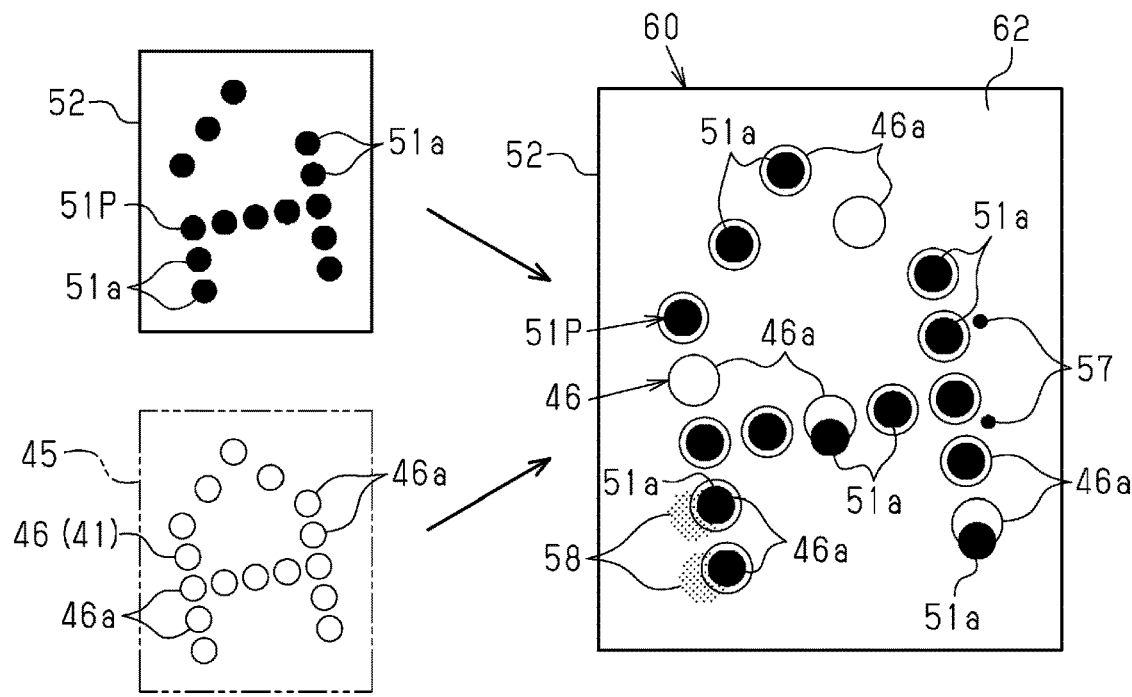
FIG. 12 is a schematic diagram illustrating the procedure of generating the inspection region identifying image.

The inspection process will now be described with reference to FIGS. 12 and 13. In FIGS. 12 and 13B, dot regions 46a are enlarged a bit for exaggeration such that the dot regions 46a are identifiable from dots 51a. FIGS. 12 and 13 schematically show that the dot regions 46a of the deformed character pattern 46 are circular, although the shapes of the dot regions 46a are distorted according to the deformation degree in reality.

As shown in FIG. 12, the inspection processor 35 generates the inspection region identifying image 60 by overlapping the deformed character pattern 46, which is included in the deformed template 45, with the character region 52, which includes the captured character pattern 51P, at the matching position. The deformed character pattern 46 shown on the lower left of FIG. 12 corresponds to a deformed character pattern of the deformed template 45 when matching occurs. By overlapping the deformed character pattern 46 on the captured image of the character region 52, the inspection region identifying image 60 is generated to identify an inspection region in the image of the character region 52.

Figure 13A:
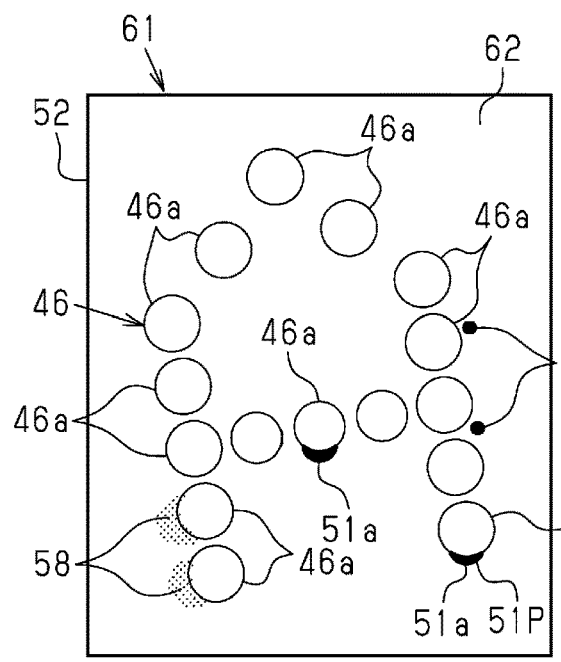
FIG. 13A is a schematic diagram illustrating a first inspection using a background image.
Figure 13B:
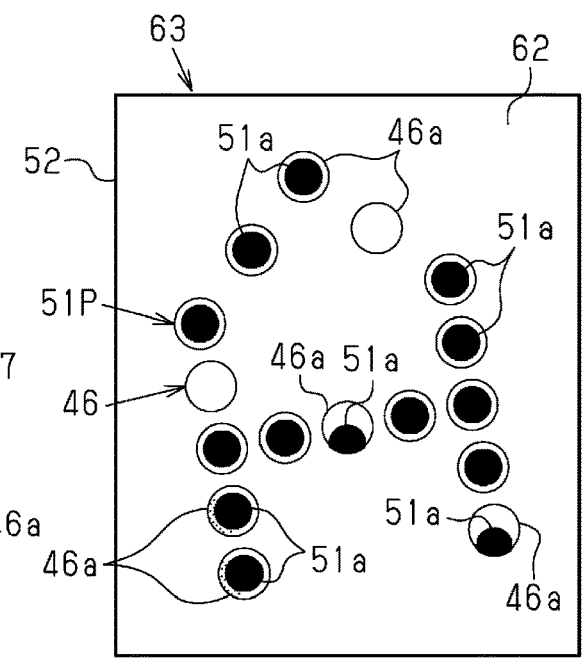
FIG. 13B is a schematic diagram illustrating a second inspection using a deformed character region image.

FIG. 13A illustrates a background image 61 of the inspection region identifying image 60, which is shown in FIG. 12. The background image 61 is obtained by extracting the image of a background region 62 that does not include the dot regions 46a. The inspection processor 35 generates the background image 61, which is shown in FIG. 13A, by removing the image of portions corresponding to the dot regions 46a from the inspection region identifying image 60, which is shown in FIG. 12. In the background image 61, the image of each dot region 46a is deleted by converting the concentration value in the dot region 46a into a value (e.g., 255) representing white. The inspection processor 35 executes a shade inspection for the background image 61. The shade inspection detects portions of which the concentration value is less than or equal to a threshold value (black portions in FIG. 13A). As a result, shifts of the dots 51a, stains 57 and blurs 58 are detected. When the shifts of the dots 51a, the stains 57 and the blurs 58 each have a predetermined area or larger and a predetermined number of times or larger, the printed character is determined as being unsatisfactory. When the background image 61 is generated, the dot regions 46a in the inspection region identifying image 60 are enlarged to, for example, 1.2 times of the original size. The portions corresponding to the dots 51a that extend from the enlarged dot regions 46a in the background image 61 are shifted beyond the allowable range.

FIG. 13B shows a deformed character region image 63 of the inspection region identifying image 60, which is shown in FIG. 12. The deformed character region image 63 is obtained by extracting the image in the dot regions 46a. The inspection processor 35 generates the deformed character region image 63, which is shown in FIG. 13B, by removing the image of portions other than the dot regions 46a from the inspection region identifying image 60, which is shown in FIG. 12. In the deformed character region image 63, the image of the background region 62 is deleted by converting the concentration value of the background region 62 into a value representing white. In the deformed character region image 63, the enlargement of the dot regions 46a to, for example, 1.2 times of the original size is not performed. In the deformed character region image 63, when the proportion of each dot 51a occupying the corresponding dot region 46a is less than a threshold value (i.e., small), the dot 51a is determined as being shifted or incomplete. The inspection processor 35 determines whether the dot 51a is shifted or incomplete from the value of the occupying proportion. When the dot 51a is shifted, the inspection processor 35 calculates the shift amount of the dot 51a from the value of the occupying proportion. In the deformed character region image 63, the enlargement of the dot region 46a of the deformed character pattern 46 to 1.2 times of the original size is not performed. The dot region 46a may be reduced to, for example, 0.8 times of the original size. In this case, when even a slight white pixel exists in the reduced dot region 46a, the dot may be determined as being shifted or incomplete (i.e., the print may be determined as being unsatisfactory).

According to a predetermined inspection rule stored in advance in the memory 31, the inspection processor 35 determines whether the printed state of a character is satisfactory from the extent and number of the shifts of the dots, the stains 57 and the blurs 58 and from the number of incomplete dots.

The operation of the print inspection device 11 of the present embodiment will now be described with reference to, for example, FIG. 14.

Figure 14:
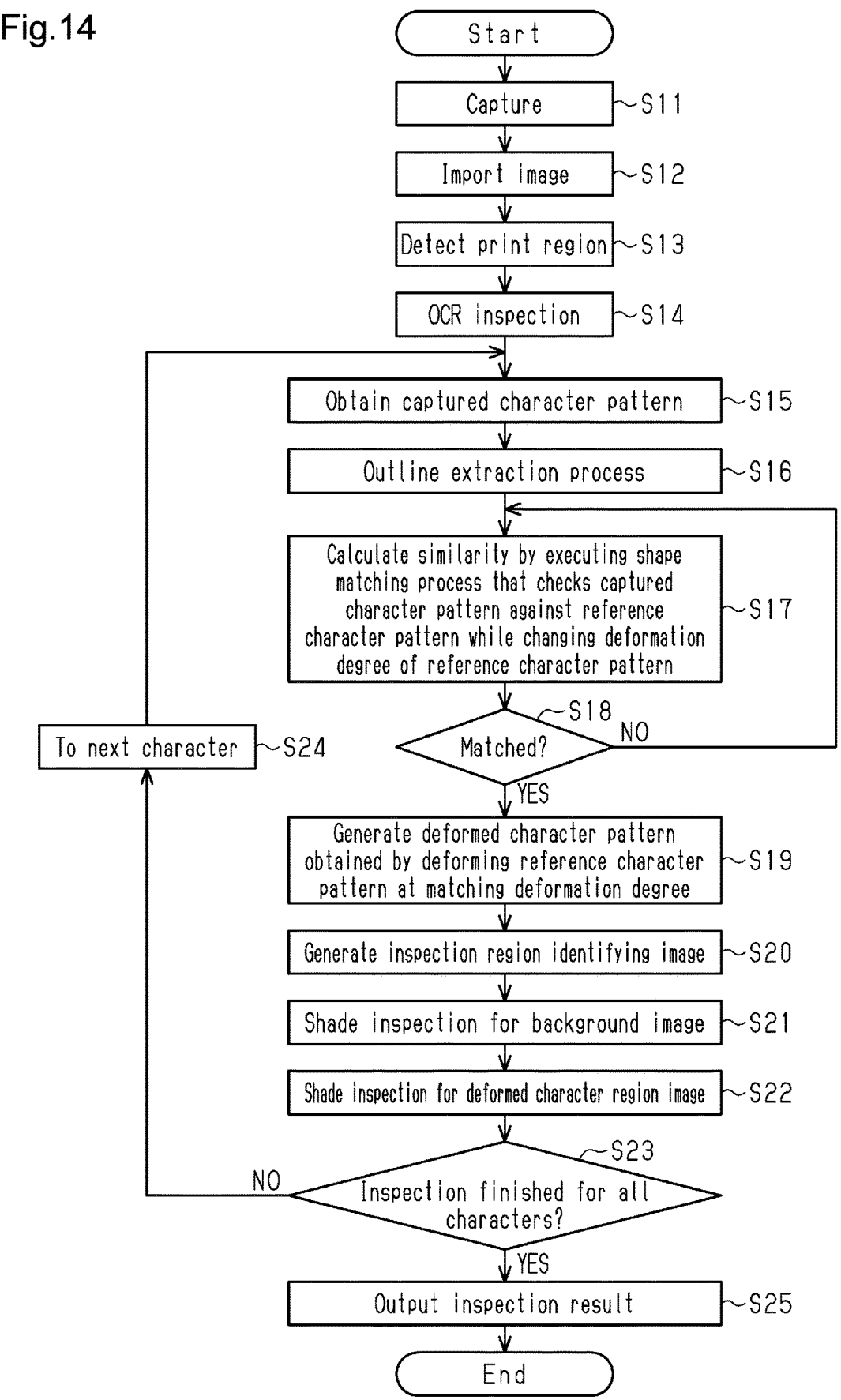
FIG. 14 is a flowchart showing a print inspection processing routine.

When the belt conveyor 13 is driven, the controller 15 executes a print inspection processing routine shown in FIG. 14. More specifically, the computer 30 in the controller 15 executes a program for the print inspection process illustrated in the flowchart of FIG. 14.

First, in step S11, the controller 15 performs capturing. After receiving, from the light sensor 16, a sensing signal that has sensed a beverage container 12, the controller 15 sends a capturing command signal to the camera 17. This causes the camera 17 to capture the character string 20 indicating the lot number and the manufacturing year and month that are printed on, for example, the outer circumferential surface 12*a* of the beverage container 12 and have been sensed by the light sensor 16. The captured image data is sent from the camera 17 to the controller 15. In the present embodiment, the process of step S11 corresponds to an example of the capturing step.

In step S12, the controller 15 imports the image. The controller 15 stores the image data, which has been received from the camera 17, in a predetermined storage area of the memory 31.

In step S13, the controller 15 detects a print region. The controller 15 extracts the image region of the beverage container 12 from the captured image that is based on the image data read from the memory 31. Then, the controller 15 extracts, as the print region 50A (see FIG. 7), a region of the beverage container 12 having a predetermined height range and a predetermined width range in the image region.

In step S14, the controller 15 executes an OCR inspection. More specifically, the OCR inspecting section 32 recognizes the characters 51 of the character string 50 in the print region 50A. Then, when the recognized characters are registered in a preset character string related to print, the OCR inspecting section 32 determines that the characters are printed. The memory 31 stores, in advance, the data of characters that can be recognized by the OCR inspecting section 32. The OCR inspecting section 32 executes the recognition process for the characters 51 one by one, and determines that the print is unsatisfactory when the character string 50 includes even one character that cannot be recognized. When the OCR inspecting section 32 recognizes the characters 21, the positions of the characters 21 are identified. Then, the character regions 52, each of which is a rectangular region including the corresponding character 51 in the print region 50A, are identified.

In step S15, the controller 15 obtains each captured character pattern 51P. That is, the controller 15 obtains the character region 52, which is a rectangular region including the captured character pattern 51P of the character 51, from the position of the character 21 that has been recognized by the OCR inspecting section 32.

In step S16, the controller 15 executes the outline extracting process. More specifically, the controller 15 executes the edge detecting process for the captured character pattern 51P of the character region 52 (see FIG. 8) to extract the outline from the edge. This generates the character region 54 including the captured character pattern 53, which is represented by the outline in FIG. 8.

In step S17, the controller 15 calculates the similarity between the captured character pattern 53 and the reference character pattern 41 by executing the shape matching process to check the captured character pattern 53 against the reference character pattern 41 while changing the deformation degree of the reference character pattern 41. More specifically, as shown in FIGS. 9A to 9E, the controller 15 checks the character patterns while changing the deformation degree of the reference character pattern 41, so as to search for the captured character pattern 53 in the character region 54. The shape matching processor 33 executes the shape matching process while changing the size and rotation angle of the reference character pattern 41 in a predetermined order. The shape matching processor 33 calculates the similarity of the captured character pattern 53 to the reference character pattern 41 at a position while moving, by each short distance $\Delta x$, the reference character pattern 41 deformed at a predetermined deformation degree.

In step S18, the controller 15 determines whether the captured character pattern 53 has matched the reference character pattern 41. That is, the controller 15 determines whether the similarity is greater than or equal to a threshold value. When the similarity is greater than or equal to the threshold value, the controller 15 determines that the captured character pattern 53 has matched the reference character pattern 41. When the similarity is less than the threshold value, the controller 15 determines that the captured character pattern 53 has not matched the reference character pattern 41. In a case where the matching has occurred, the process is advanced to step S19. In a case where the matching has not occurred, the process is returned to step S17 to repeat the shape matching process.

When division matching is set, the shape matching process in step S17 is executed for each divided region using the division template 42, instead of using the template 40. That is, as shown in FIG. 11A, the shape matching processor 33 executes the shape matching process while changing the deformation degree of the divided reference character pattern 41*a* using the first divided template 42*a*. Then, as shown in FIG. 11B, the shape matching processor 33 executes the shape matching process while changing the deformation degree of the divided reference character pattern 41*b* using the second divided template 42*b*. The shape matching processor 33 repeats the shape matching process (step S17) until the controller 15 determines that the similarity is greater than or equal to the threshold value in each divided region (step S18).

In step S17, the shape matching processor 33 may execute the pyramid search, which is shown in FIG. 10. When executing the pyramid search, the shape matching processor 33 executes the shape matching process from low-resolution templates toward high-resolution templates in order. Thus, the shape matching process simply needs to be executed at the resolution of the subsequent level in the range 55 that has been narrowed down by the shape matching process executed at the resolution of the preceding level. This allows the shape matching process to be executed at high speed. The pyramid search may be employed in the division matching. In the present embodiment, the processes of steps S17, S18 correspond to an example of the shape matching processing step.

In step S19 shown in FIG. 14, the controller 15 generates the deformed character pattern 46 obtained by deforming the reference character pattern 41 at the matching deformation degree. When deforming the reference character pattern 41, the controller 15 uses regional morphology to generate the deformed character pattern. The reference character pattern 41 can be created as an artificial character pattern using image creating software on a personal computer. However, the reference character pattern 41 created from an image that captures the print region of a satisfactory beverage container 12 may meet actual conditions and may be preferred for inspection accuracy. In this example, the reference character pattern 41 created using the latter method is employed. Thus, the reference character pattern 41 includes cut areas in the outline of a small stain or a character pattern. To make the deformed character pattern 46 a region, the cut areas of a line need to be connected to each other. However, if there are small stains, a line that connects the stains to each other may be drawn. To solve this problem, a noise removing process is executed to remove noise (e.g., stains). Then, regional morphology is employed to connect lines, thereby generating the deformed character pattern 46. Examples of regional morphology operations include joining, intersection, subtraction, complement, translation, gap filling, erosion, and dilation. In this manner, the template 40 including the reference character pattern 41 is used to restore, as the deformed character pattern 46, the region of a character that is based on the deformation degree corresponding to the difference in distance from the camera 17 to the print surface or the state of the print surface.

In a case where division matching is set, the controller 15 deforms the divided reference character patterns 41a, 41b at the matching deformation degree and synthesizes the deformed divided reference character patterns 41a, 41b into a single character, thereby generating the deformed character pattern 46 (see FIG. 11C). In this case, when the divided reference character patterns 41a, 41b are created from an image that captures the print region of a satisfactory beverage container 12, the noise removing process and regional morphology are used in the same manner to generate the deformed character pattern 46.

In step S20 shown in FIG. 14, the controller 15 generates the inspection region identifying image 60. More specifically, as shown in FIG. 12, the inspection processor 35 generates the inspection region identifying image 60 by overlapping the deformed character pattern 46 with the character region 52, which includes the captured character pattern 51P, at the matching position. The inspection region identifying image 60 is an image of the captured character region 52 and is an image that identifies the inspection region subject to inspection.

In step S21, the controller 15 executes the shade inspection for the background image 61. More specifically, the inspection processor 35 generates the background image 61 in FIG. 13A, which is obtained by extracting the image of the background region 62 of the inspection region identifying image 60 in FIG. 12 other than the deformed character pattern 46, and executes the shade inspection for the background image 61. In this inspection, namely, a first inspection, the inspection processor 35 detects shifts of the dots 51a, the stains 57, and the blurs 58 in FIG. 13A in the background image 61 from the distribution and number of pixels in which the concentration value (pixel value) is less than or equal to a first threshold value. Further, the inspection processor 35 identifies shifts of the printed dots and identifies the positions of the stains 57 and the blurs 58 from the positions of the distributed pixels. The first threshold value is obtained by multiplying the average concentration of the inspection region identifying image 60 by a predetermined value (e.g., 0.8).

In step S22, the controller 15 executes the shade inspection for the deformed character region image 63. More specifically, the inspection processor 35 generates the deformed character region image 63 (shown in FIG. 13B), which is obtained by extracting the image of the region of the deformed character pattern 46 in the inspection region identifying image 60 (shown in FIG. 12), and executes the shade inspection for the deformed character region image 63. In this inspection, namely, a second inspection, the inspection processor 35 refers to the distribution and number of pixels in which the concentration value is greater than or equal to a second threshold value in the dot regions 46a to calculate the proportion of the pixels occupying the dot regions 46a (e.g., white occupying proportion). When the occupying proportion is greater than or equal to an occupying proportion threshold value, the inspection processor 35 determines that the dots 51a are shifted or incomplete. The inspection processor 35 also determines whether the dots are shifted or incomplete from the value of the occupying proportion. The second threshold value is obtained by multiplying the average concentration of the inspection region identifying image 60 by a predetermined value (e.g., 1.2). In the present embodiment, the processes from steps S20 to S22 correspond to an example of the inspection processing step.

In step S23, the controller 15 determines whether inspection is finished for all the characters. When inspection has not been finished for all the characters of the character string 50, the process is advanced to step S24 to inspect the next character and then repeat the processes from steps S15 to S22. When inspection is performed for each character and inspection is finished for all the characters (affirmative determination in step S23), the process proceeds to step S25.

In step S25, the controller 15 outputs the inspection result. More specifically, the inspection processor 35 determines whether the printed state of the character string 50 is satisfactory from the inspection result of all the characters. The controller 15 sends, to the display processor 37, a display command that causes the monitor 19 to display the inspection result indicating whether the printed state of the character string 50 is satisfactory. The display processor 37 causes the monitor 19 to display the inspection result indicating whether the printed state is satisfactory. When the inspection result indicates that the prints are unsatisfactory, the controller 15 sends a rejection command to the rejection processor 36. The rejection processor 36 drives the rejection mechanism 18 to reject, from the belt conveyor 13, the beverage container 12 that includes print defects.

The embodiment described in detail achieves the following advantages.

(1) The print inspection device 11 includes the camera 17 (capturing section), the shape matching processor 33, the deformation pattern generator 34, and the inspection processor 35. The camera 17 captures a region of an inspection target including a portion on which a character is printed. The shape matching processor 33 checks the shape of the captured character pattern 51P (53) included in the captured image obtained by the camera 17 against the shape of the preset reference character pattern 41 while changing the deformation degree of the shape of the reference character pattern 41 and searches for a matched character in which the similarity of the shape of the captured character pattern 51P (53) to the shape of the reference character pattern 41 is greater than or equal to a threshold value. The deformation pattern generator 34 generates the deformed character pattern 46, which is obtained by deforming the reference character pattern 41 at the deformation degree to which the character is matched in the shape matching process. The inspection processor 35 inspects whether the printed state of the character is satisfactory from the result of the comparison between the deformed character pattern 46 and the captured character pattern 51P.

In this configuration, the shape matching process is executed to check the shape of the captured character pattern 51P (53) against the shape of the reference character pattern 41 while changing the deformation degree of the shape of the reference character pattern 41 and to search for the matched character in which the similarity of the shape of the captured character pattern 51P (53) to the shape of the reference character pattern 41 is greater than or equal to the threshold value. Further, the deformed character pattern 46, which is obtained by deforming the reference character pattern 41 at the deformation degree to which the character is matched, is generated. Even if the printed characters are deformed in an allowable range, the result of the comparison between the deformed character pattern 46 deformed at the same deformation degree and the captured character pattern 51P can be used to properly inspect whether the printed states of the characters are satisfactory. Even if the characters 51 in the captured image are deformed in the allowable range because, for example, the characters are printed on a curved print surface or the angle formed by the optical axis of the camera 17 and the print surface is not 90°, the printed states of the characters 51 are determined as being satisfactory. In the shape matching process, when there are local print defects (e.g., print shifts, incomplete dots, stains 57, and blurs 58) but the similarity is greater than or equal to the threshold value, the print defects may be ignored. However, the present embodiment compares the captured character pattern 51P with the deformed character pattern 46 so as to inspect whether there are local print defects (e.g., print shifts, incomplete dots, stains 57, and blurs 58). This allows for accurate inspection of whether the printed states of printed characters are satisfactory. As compared with a shade matching process that requires a large number of templates for each factor (e.g., the size, rotation angle, and brightness of a character), the shape matching process needs to check only the shapes of a small number of templates, namely, the templates 40, 42 and thus shortens the processing time. This improves the accuracy and speed of inspecting a character printed on an inspection target.

(2) The divided reference character patterns 41a, 41b and the like are obtained by dividing the reference character pattern 41 by a predetermined number of divisions. The divided character pattern is obtained by dividing the captured character pattern 53 by the same number of divisions. The shape matching processor 33 executes, for each of the divided regions, the shape matching process to check the shape of the divided reference character pattern 41a, 41b and the like against the shape of the divided character pattern while changing the deformation degree of the divided reference character pattern 41a, 41b and the like and to search for the matched divided character pattern in which the similarity of the shape of the divided portion of the captured character pattern 53 to the shape of the divided reference character pattern 41a, 41b and the like is greater than or equal to a threshold value. The deformation pattern generator 34 generates the divided deformed character pattern for each of the divided regions based on the deformation degree and the divided reference character pattern 41a, 41b and the like for each of the divided regions, and generates the deformed character pattern 46 by synthesizing the divided deformed character patterns into a single character. Thus, the divided reference character patterns 41a, 41b and the like matched in the shape matching process executed for respective divided regions are synthesized into a single character at the corresponding deformation degree, thereby generating the deformed character pattern 46. This further increases the accuracy of inspecting printed characters.

(3) The number of divisions of the divided reference character patterns 41a, 41b and the like is individually set for each character. Thus, a decrease in the speed of inspecting a printed character is limited and the accuracy of inspecting a character is increased.

(4) The partition lines 43a to 43c that divide the rectangular region including the divided reference character patterns 41a to 41c (FIG. 6B) include two or more oblique partition lines 43a that intersect the sides of the rectangular region at an acute angle. The rectangular region is divided into three or more divisions by the partition lines 43a to 43c including the two or more oblique partition lines 43a. Thus, as compared with when the rectangular region is divided only by partition lines that include lines parallel to the sides of the rectangular region, the accuracy of inspecting printed characters is further increased.

(5) The shape matching processor 33 changes the deformation degree by changing at least one of the size or rotation angle of the reference character pattern 41. Thus, the shape matching process checks the shape of a character while changing at least one of the size or rotation angle of the reference character pattern 41. This increases the accuracy of inspecting printed characters. Particularly, the present embodiment changes both the size and rotation angle of the reference character pattern 41 and thus further increases the accuracy of inspecting printed characters.

(6) The inspection processor 35 inspects whether the printed state of the character is satisfactory by generating the inspection region identifying image 60, in which the deformed character pattern 46 is overlapped with the character region 52 including the captured character pattern 51P at the matching position, and executing the shade inspection for the background image 61 other than the region of the deformed character pattern 46 in the inspection region identifying image 60. This allows for inspection of whether the printed character includes print defects (e.g., print shifts, stains 57, and blurs 58) and thus allows for accurate inspection of whether the printed state of the printed character is satisfactory.

(7) The inspection processor 35 inspects whether the printed state of the character is satisfactory by generating the inspection region identifying image 60, in which the deformed character pattern 46 is overlapped with the character region 52 including the captured character pattern 51P at the matching position, and executing the shade inspection for the deformed character region image 63 corresponding to the region of the deformed character pattern 46 in the inspection region identifying image 60. This allows for inspection of whether the printed character includes print defects (e.g., print shifts and incomplete dots) and thus allows for accurate inspection of whether the printed state of the printed character is satisfactory.

(8) The print inspection method includes the capturing step (S11), the shape matching processing step (steps S17, S18), the deformation pattern generating step (step S19), and the inspection processing step (steps S20 to S22). The capturing step captures a region of an inspection target including a portion on which a character is printed. The shape matching processing step checks the shape of the captured character pattern 51P included in the captured image obtained in the capturing step against the shape of the preset reference character pattern 41 while changing the deformation degree of the shape of the reference character pattern 41 and searches for a matched character in which the similarity of the shape of the captured character pattern 51P to the shape of the reference character pattern 41 is greater than or equal to a threshold value. The deformation pattern generating step generates the deformed character pattern 46, which is obtained by deforming the reference character pattern 41 at the deformation degree to which the character is matched in the shape matching process. The inspection processing step inspects whether the printed state of the character is satisfactory from the result of the comparison between the deformed character pattern 46 and the captured character pattern 51P. Accordingly, the print inspection method provides the same advantage as (1), which is obtained by the print inspection device 11.

(9) The program is executed by the computer 30 that executes the character inspection process that inspects a character included in a target image. The program causes the computer 30 to execute the shape matching processing step (steps S17, S18), the deformation pattern generating step (step S19), and the inspection processing step (steps S20 to S22). The shape matching processing step checks the shape of the captured character pattern 51P (53) included in the target image against the shape of the preset reference character pattern 41 while changing the deformation degree of the shape of the reference character pattern 41 and calculates the similarity of the shape of the captured character pattern 51P (53) to the shape of the reference character pattern 41. The deformation pattern generating step generates the deformed character pattern 46 obtained by deforming the reference character pattern 41 at the deformation degree to which the similarity is greater than or equal to a threshold value. The inspection processing step inspects whether the printed state of the character is satisfactory from the result of the comparison between the deformed character pattern 46 and the captured character pattern 51P. Accordingly, the same advantage as (1), which is obtained by the print inspection device 11, is obtained by causing the computer 30 to execute the program.

The above-described embodiment may be modified as follows.

Figure 15:
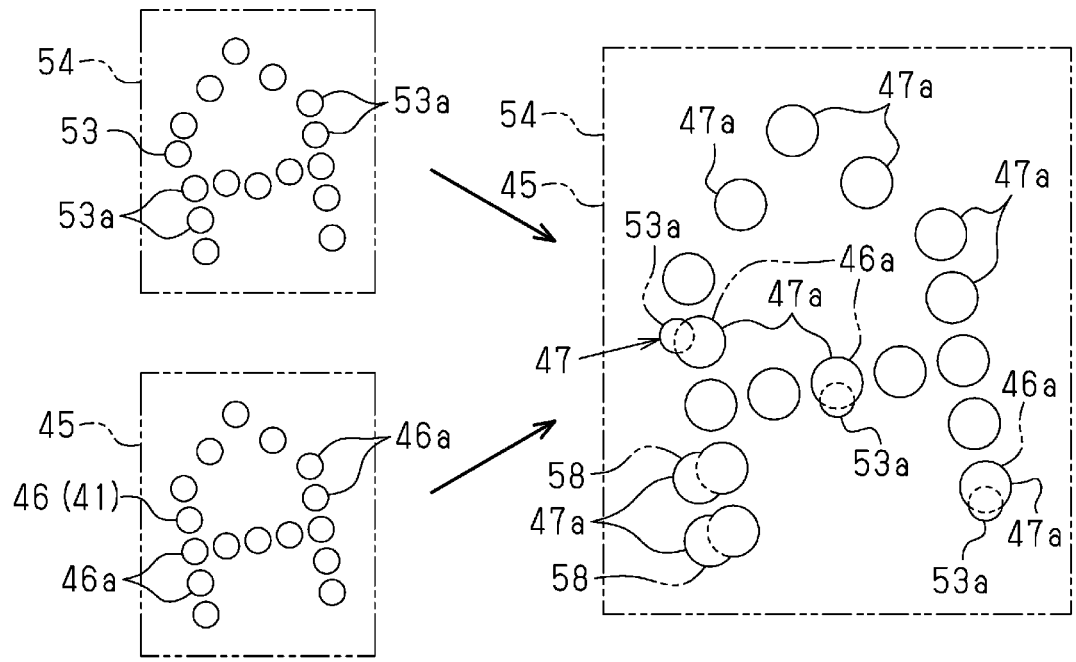
FIG. 15 is a schematic diagram illustrating the procedure of generating a combined character region.

The inspection processor 35 does not have to execute the first inspection or the second inspection. Instead, the inspection processor 35 may execute a third inspection as follows. The inspection processor 35 generates a combined character region 47, which is shown on the right side of FIG. 15, by combining the region of the captured character pattern 53 and the region of the deformed character pattern 46 at the matching position as shown on the left side of FIG. 15. The combined character region 47 includes combined dot regions 47a at positions corresponding to the dot regions 46a of the deformed character pattern 46. As shown in FIG. 15, each combined dot region 47a is broader than the corresponding dot region 46a by a shift amount of a dot 53a at the position where the dot region 46a and the dot 53a are shifted from each other. In each dot 53a including a blur 58, the combined dot region 47a is broader than the dot region 46a by an amount corresponding to the blur 58.

Figure 16:
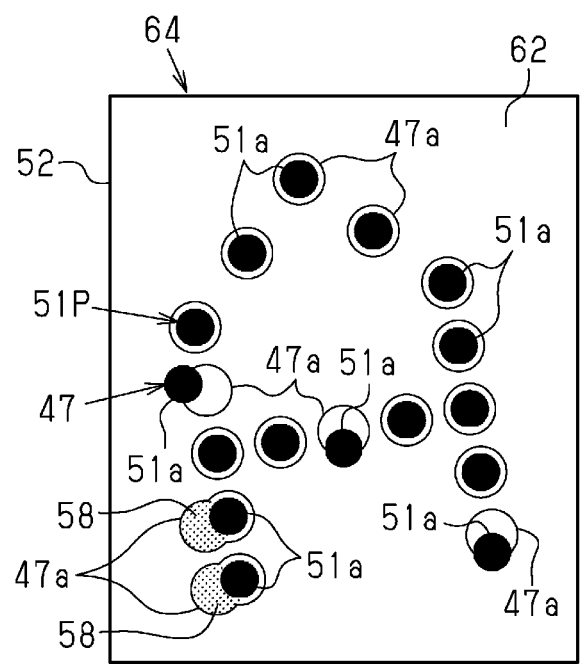
FIG. 16 is a schematic diagram illustrating a third inspection using a combined character region image.

As shown in FIG. 16, the inspection processor 35 generates a combined character region image 64 by overlapping the combined character region 47 on the character region 52 including the captured character pattern 51P in the captured image. The combined character region 47 is generated by combining the region of the deformed character pattern 46 (see FIG. 15) and the region of the captured character pattern 53 (see FIG. 15) each other at the matching position. The inspection processor 35 executes a shade inspection for the combined character region image 64 in the range of the combined character region 47.

When the proportion of each dot 51a occupying the corresponding combined dot region 47a is less than a threshold value (i.e., small), the inspection processor 35 determines whether the dot 51a is shifted, is incomplete, or includes the blur 58. The inspection processor 35 determines whether the dot 51a is shifted or incomplete from the value of the occupying proportion. The third inspection is less likely to calculate a small occupying proportion than the second inspection (FIG. 13B) even if the area of each portion where the dot 51a or the blur 58 extends from the dot region 46a is the same. Thus, a small print shift and a small blur 58 are not determined as being print defects.

For example, when a character is printed on a soft container (e.g., pouch) of which the print surface deforms at random, small print shifts occur unavoidably. Thus, some users do not want to treat the small print shifts as print defects in terms of the production yield rate. The third inspection determines that the printed state of the character is satisfactory even if the character includes a small print shift or a small blur 58, which would be determined as being unsatisfactory by the second inspection. Thus, the third inspection avoids situations in which small print shifts are determined as having defects. Additionally, even if the amount of a print shift varies to some extent, the inspection result is uniform without variations. Thus, the third inspection not only provides a rough inspection result indicated by the shape matching process for a character printed on an easily-deformable print surface, but also inspects whether the character includes print defects (e.g., shifts, blurs 58, and incomplete dots). This allows for accurate inspection of whether the printed states of characters are satisfactory and makes the inspection result uniform. The third inspection is useful for print inspection for a container (e.g., pouch) of which the print surface deforms at random.

The inspection processor 35 only needs to execute at least one of the first inspection, the second inspection, or the third inspection. For example, the inspection processor 35 may execute only one of the first to third inspections or may combine one of these inspections with another one of the inspections. Alternatively, the inspection processor 35 may execute a combination of the first and third inspections or a combination of the second and third inspections, or may execute all of the first to third inspections. As another option, these multiple inspections may be prepared for the print inspection device 11 so that the inspector can select the inspections by operating an input device.

The deformation of the reference character pattern 41 in the shape matching process simply needs to be at least one of size or rotation. For example, the deformation may be only size or rotation. Alternatively, the deformation may be an inclination in which a character is inclined so as to become oblique or may be deformation in which the size of a character gradually decreases or increases toward its one end like the shape of a character printed on a curved surface as viewed from the front. As another option, the magnification of the character may be changed only in one direction.

For example, the character may be expanded or contracted only in the width direction or only in the height direction. As an alternative, the character may be deformed so as to have the shape of a fan or an inverted fan. Instead, these types of deformation may be combined.

In the above-described embodiment, the method for restoring the matched deformed character pattern 46 to the deformed character pattern 46 represented in a region does not have to be regional morphology. Instead, for example, the deformed character pattern 46 may be obtained by storing, in the memory 31, the reference character pattern represented in a region created using image creating software or the like and deforming the reference character pattern using the parameters (e.g., size and rotation angle) of the matching deformation degree. Alternatively, the restoration using regional morphology may use the parameters of the matching deformation degree.

To generate the background image 61, the captured image of the character region 52 may be overlapped with the image of the deformed template 45 in which the background region is made transparent and the inside of the dot region 46a is made white. To generate the deformed character region image 63, the captured image of the character region 52 may be overlapped with the image of the deformed template 45 in which the background region is made white and the inside of the dot region 46a is made transparent.

In the above-described embodiment, a dot character in which printed dots are separated from one another is used. Alternatively, a character obtained by combining a dot with its adjacent dot may be used. Instead of a dot character in which a character is formed by dots (e.g., 5×8 or 5×9), a character may be printed in a predetermined typeface (e.g., gothic typeface or Ming-style typeface).

In the above-described embodiment, the division templates 42 do not have to be used. That is, the shape matching process may be executed using only the templates 40.

The pyramid search does not have to be executed.

An OCR inspection does not have to be executed. When an OCR inspection is not executed, the memory 31 may store text information of the character string 20. By referring to the text information, characters used for a template in the shape matching process can be narrowed down. This eliminates the need to execute a matching process a number of times using multiple templates for the shape matching process for a single character.

The inspection processor 35 may binarize the background image 61 (FIG. 13A) and the deformed character region image 63 (FIG. 13B) so as to calculate the occupying proportion from the areas of white regions and black regions in the background region 62 and the dot region 46a.

The boundaries of the divided templates 42a, 42b, 42c do not necessarily have to overlap each other.

Each template 40 is divided into three sections by multiple partition lines including two oblique partition lines 43a. Instead, the template 40 may be divided into three sections by multiple partition lines including one oblique partition line 43a. Alternatively, the template 40 may be divided into three sections using three oblique partition lines 43a. As another option, the template 40 may be divided into four or more sections using multiple partition lines including two oblique partition lines 43a. As an alternative, the template 40 may be divided into two sections using one or two oblique partition lines 43a.

The character subject to inspection may be a symbol or a character such as kanji, hiragana, katakana, roman character, alphabetical character, or number.

The character string may be used to inspect a character other than a manufacturing date, a best-by date, an expiration date, or a lot number.

The inspection target may include a printed code in addition to a printed character. In this case, the code may be a one-dimensional code, such as a barcode, or a two-dimensional code, such as a QR code (registered trademark).

In the above-described embodiment, the OCR inspecting section 32, the shape matching processor 33, the deformation pattern generator 34, the inspection processor 35, the rejection processor 36, and the display processor 37 may be provided by software established by a CPU executing a program. Instead, these components may be provided by hardware (e.g., IC). Alternatively, these components may be provided through cooperation of software and hardware.

The print surface of a character may be flat. Instead, the print surface may be a recessed curved surface or an inclined surface.

The inspection target (target) is not limited to a beverage container, such as a plastic container, a paper container, a bottle, or a can for beverage, and may be a food container, such as a can, a bottle, a paper container, a plastic container, or a pouch container. Further, the inspection target is not limited to food, and may be a container (e.g., a cardboard box) that accommodates other products or semi-manufactured products. Furthermore, the inspection target is not limited to a container, and may be a product prior to being accommodated in a container. Examples of the product include an electronic product, a stationary, tableware, a building material, and a component. Instead, the inspection target may be a product to which a character-printed seal is bonded.

Printing does not have to be performed using an inkjet printer, and may be performed using a laser printer or a dot impact printer. Alternatively, printing using laser light of a laser marker (i.e., engraving) may be performed.

REFERENCE SIGNS LIST

11) Print Inspection Device; 12) Beverage Container (Inspection Target); 15) Controller; 17) Camera (Capturing Unit); 20) Character String; 21) Character; 30) Computer; 31) Memory; 32) OCR Inspecting Section; 33) Shape Matching Processor; 34) Deformation Pattern Generator; 35) Inspection Processor; 36) Rejection Processor; 37) Display Processor; 38) Deformation Processor; 40, 40A, 40B, 40C, 40D) Template; 41) Reference Character Pattern; 41a, 41b, 41c) Divided Reference Character Pattern; 42) Division Template; 42a, 42b, 42c) Divided Template; 43a, 43b, 43c) Partition Line; 45) Deformed Template; 46) Deformed Character Pattern; 46a) Dot Region; 47) Combined Character Region; 47a) Combined Dot Region; 50A) Print Region; 50) Character String; 51) Character; 51P) Captured Character Pattern; 51a) Dot; 52) Character Region; 53) Captured Character Pattern; 54) Character Region; 55) Range; 57) Stain; 58) Blur; 60) Inspection Region Identifying Image; 61) Background Image; 62) Background Region; 63) Deformed Character Region Image; 64) Combined Character Region Image

The invention claimed is:

1. A print inspection device that inspects a character printed on an inspection target, the print inspection device comprising:

a capturing section that captures a region of the inspection target including a portion on which the character is printed;

a shape matching processor that executes a shape matching process to check a shape of a captured character pattern included in a captured image obtained by the capturing section against a shape of a preset reference character pattern while changing a deformation degree of the shape of the reference character pattern and to search for a matched character in which a similarity of the shape of the captured character pattern to the shape of the reference character pattern is greater than or equal to a threshold value;

a deformation pattern generator that generates a deformed character pattern, the deformed character pattern being obtained by deforming the reference character pattern at a deformation degree to which the character is matched in the shape matching process; and an inspection processor that inspects whether a printed state of the character is satisfactory from a result of comparison between the deformed character pattern and the captured character pattern.

2. The print inspection device according to claim 1, wherein divided reference character patterns are obtained by dividing the reference character pattern by a predetermined number of divisions, and divided character patterns are obtained by dividing the captured character pattern by the number of divisions, the shape matching processor executes, for each of divided regions, a shape matching process to check a shape of the divided reference character pattern against a shape of the divided character pattern while changing deformation degree of the divided reference character pattern and to search for a matched divided reference character pattern in which a similarity between the shape of the divided character pattern and the shape of the divided reference character pattern is greater than or equal to a threshold value, and the deformation pattern generator generates a divided deformed character pattern for each of the divided regions based on the deformation degree and the divided reference character pattern for each of the divided regions and generates the deformed character pattern by synthesizing the divided deformed character patterns into a single character.

3. The print inspection device according to claim 2, wherein the number of divisions of the divided reference character patterns is individually set for each of characters.

4. The print inspection device according to claim 2, wherein partition lines that divide a rectangular region including the divided reference character patterns include two or more oblique partition lines that intersect a side of the rectangular region at an acute angle, and the rectangular region is divided into three or more divisions by the partition lines including the two or more oblique partition lines.

5. The print inspection device according to claim 1, wherein the shape matching processor changes the deformation degree by changing at least one of a size or a rotation angle of the reference character pattern.

6. The print inspection device according to claim 1, wherein the inspection processor inspects whether the printed state of the character is satisfactory by generating an inspection region identifying image in which the deformed character pattern is overlapped with a character region including the captured character pattern in the captured image at a matching position and executing a shade inspection for a background image other than the deformed character pattern in the inspection region identifying image.

7. The print inspection device according to claim 1, wherein the inspection processor inspects whether the printed state of the character is satisfactory by generating an inspection region identifying image in which the deformed character pattern is overlapped with a character region including the captured character pattern in the captured image at a matching position and executing a shade inspection for a region of the deformed character pattern in the inspection region identifying image.

8. The print inspection device according to claim 1, wherein the inspection processor inspects whether the printed state of the character is satisfactory by executing a shade inspection for a combined character region, the combined character region being obtained by combining a region of the captured character pattern and a region of the deformed character pattern that are overlapped at a matching position with a character region including the captured character pattern in the captured image.

9. A print inspection method that inspects a character printed on an inspection target, the print inspection method comprising:

a capturing step that captures a region of the inspection target including a portion on which the character is printed;

a shape matching processing step that executes a shape matching process to check a shape of a captured character pattern included in a captured image obtained in the capturing step against a shape of a preset reference character pattern while changing a deformation degree of the shape of the reference character pattern and to search for a matched character in which a similarity of the shape of the captured character pattern to the shape of the reference character pattern is greater than or equal to a threshold value;

a deformation pattern generating step that generates a deformed character pattern, the deformed character pattern being obtained by deforming the reference character pattern at a deformation degree to which the character is matched in the shape matching process; and an inspection processing step that inspects whether a printed state of the character is satisfactory from a result of comparison between the deformed character pattern and the captured character pattern.

10. A non-transitory computer readable medium storing a program executed by a computer that executes a character inspection process that inspects a character included in a target image, the program comprising: causing the computer to execute:

a shape matching processing step that executes a shape matching process to check a shape of a captured character pattern included in the target image against a shape of a preset reference character pattern while changing a deformation degree of the shape of the reference character pattern and to calculate a similarity of the shape of the captured character pattern to the shape of the reference character pattern;

a deformation pattern generating step that generates a deformed character pattern, the deformed character pattern being obtained by deforming the reference character pattern at a deformation degree to which the similarity is greater than or equal to a threshold value; and an inspection processing step that inspects whether a printed state of the character is satisfactory from a result of comparison between the deformed character pattern and the captured character pattern.

* * * * *